Figure 1:
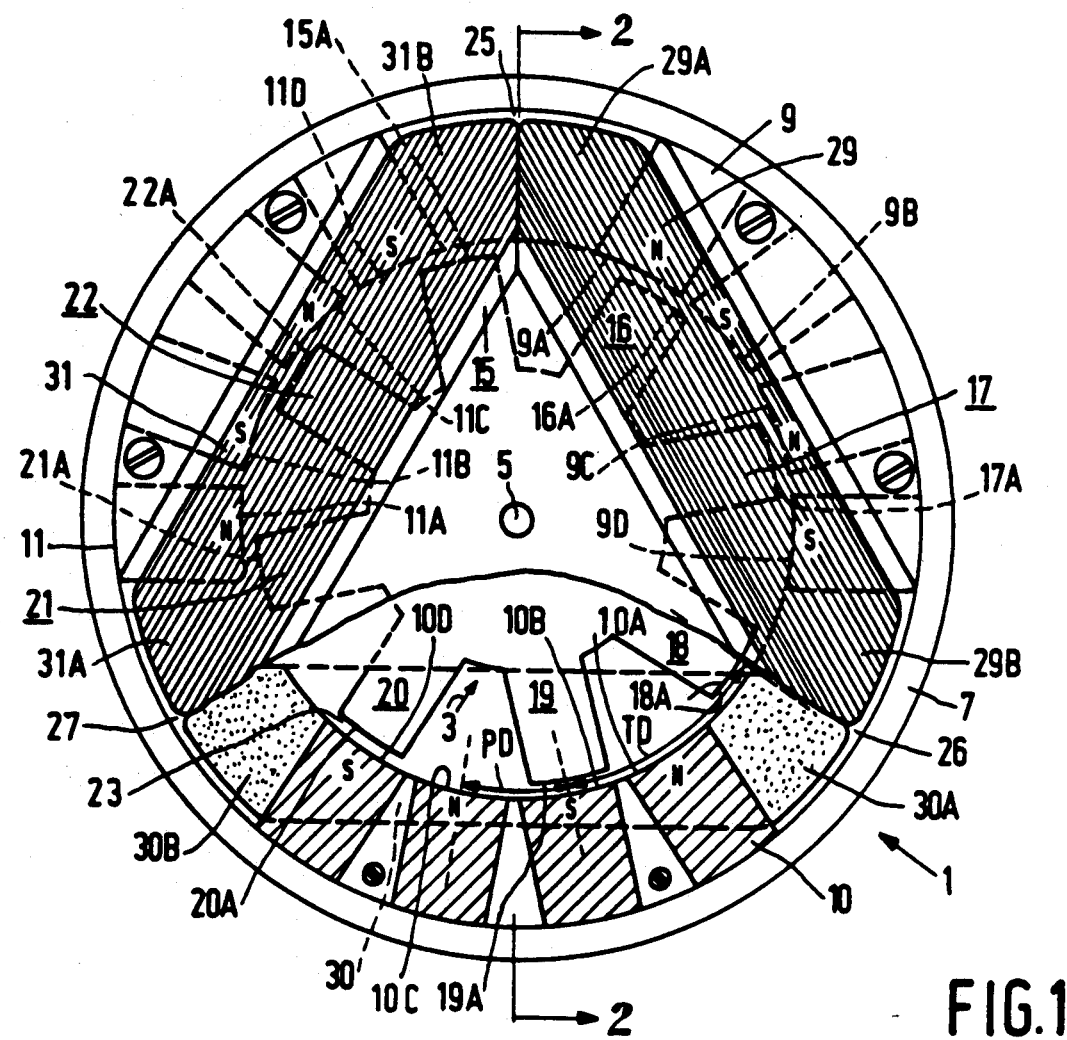

United States Patent [19]

Dijken

[11] Patent Number: 5,010,268
[45] Date of Patent: Apr. 23, 1991

[54] ELECTRICAL MULTI-POLE MACHINE

[75] Inventor: Reinder H. Dijken, Groningen, Netherlands

[73] Assignee: U.S. Philips Corporation, New York, N.Y.

[21] Appl. No.: 359,468

[22] Filed: May 31, 1989

[30] Foreign Application Priority Data

Jun. 27, 1988 [NL] Netherlands ............... 8801628

[51] Int. Cl.$^5$ .................. H02K 1/12; H02K 21/26; H02K 1/00
[52] U.S. Cl. ........................ 310/254; 310/154; 310/181; 310/258
[58] Field of Search ............ 310/49 R, 152, 154, 310/179, 180, 181, 185, 254, 258

[56] References Cited

U.S. PATENT DOCUMENTS

| | | | |
|---|---|---|---|
| 3,984,711 | 10/1976 | Kordik | 310/181 |
| 3,999,107 | 12/1976 | Reuting | 310/181 |
| 4,011,479 | 3/1977 | Volkrodt | 310/181 |
| 4,563,602 | 1/1986 | Nagasaka | 310/49 R |
| 4,728,830 | 5/1988 | Gamble | 310/49 R |
| 4,745,312 | 5/1988 | Nagasaka | 310/49 R |

Primary Examiner—Steven L. Stephan
Assistant Examiner—C. LaBalle
Attorney, Agent, or Firm—Bernard Tiegerman

[57] ABSTRACT

An electrical multi-pole machine comprises a stator (1) having a soft-magnetic outer body (7) with permanent magnets comprising pole faces (9A–9D, 10A–10D, 11A–11D) arranged along a circular path, a rotor (3) which is coaxial with the stator and which comprises a soft-magnetic inner body (13) with teeth (15–22) comprising regularly spaced tooth surfaces (15A–22A) disposed along a circular path and which cooperate with the pole faces via an air gap (23), at least three active coils (29, 30, 31), and a machine shaft (5). The pole faces are arranged in groups, at least three groups (9, 10, 11) of magnets being provided, which groups are spaced from each other by coil slots (25, 26, 27) in which coil sides (29A, B, 30A, B, 31A, B) of the active coils are accommodated. Adjacent pole faces in each of said groups have opposite polarities. The center-to-center distance between two successive tooth faces, measured along the circumferential circle of the rotor, is approximately twice as large as the center to center distance, measured along the same circle, between two adjacent pole faces in each of said groups.

4 Claims, 1 Drawing Sheet

ELECTRICAL MULTI-POLE MACHINE

The invention relates to an electrical multi-pole machine of the electromagnetic type, the machine comprising a first machine section which comprises a soft-magnetic first body provided with permanent magnets having pole faces disposed along a first circularly cylindrical surface, a second machine section which is coaxial with the first machine section and which comprises a second body provided with soft-mangnetic teeth having regularly spaced tooth surfaces which are disposed along a second circularly cylindrical surface and which cooperate with the pole faces via an air gap, at least three active coils each having two opposite coil sides, and a machine shaft about which said machine sections are rotatable relative to each other.

Such an electrical machine in the form of a small brushless d.c. motor is disclosed in German Patent Specification 28 35 210 (herewith incorporated by reference). The known electric motor comprises a rotor provided with a bell-shaped outer body and a four-pole magnet ring glued against the inner side of the outer body. The stator of the known motor comprises a lamination assembly having four radially directed T-shaped stator teeth, each having a curved toothed surface which cooperates with the magnet ring via a cylindrical air gap. The stator teeth carry active coils. A disadvantage of the known electric motor is that the rotatable motor section carrier a number of magnets which may give rise to problems in balancing the rotatable section.

It is the object of the invention to provide an electrical machine which, for a given speed and given dimensions, is capable of delivering the same power as the known machine but which comprises a small number of rotatable parts, which parts can be manufactured with a satisfactorily low degree of unbalance in order to mitigate the balancing problems simply and economically.

To this end the electrical machine in accordance with the invention is characterized in that the soft-magnetic first body is a cylindrical outer body on whose inner side the radially magnetized magnets are arranged, in that the first machine section is constructed as the stator and the second machine section is constructed as the rotor and the pole faces, viewed in the circumferential direction of said first cylindrical surface, are arranged in groups, at least three groups of magnets being distinguished, the number of groups of magnets being equal to the number of active coils, which groups are separated from one another by coil slots in which the coil sides of the active coils are accommodated, adjacent pole faces in each of said groups having opposite polarities, in that the tangential dimensions of the axially and tangentially extending tooth surfaces are smaller than or equal to the corresponding dimensions of the pole faces, and in that two of said coil sides of the active coils are accommodated in each of the coil slots which extend at least substantially parallel to the machine shaft, said coil sides of each individual active coil each being accommodated in one of the coil slots at opposite sides of one of the groups of magnets and being interconnected by coil end portions.

A major advantages of the machine in accordance with the invention as compared with the known electric motor is that both the coils and the permanent magnets are disposed in the stator. As a result of this the magnets, in contrast with those in the known electric motor, cannot produce any unbalance forces in the rotor. The soft-magnetic body of the rotor can be assembled from a plurality of metal sheets to form a lamination assembly of accurate dimensions, so that the rotor thus formed will present hardly or no balancing problems. Another advantage is that winding length of the turns of the active coils is comparatively small, which has a favourable effect on the electrical resistance of the coils and which is favourable in order to obtain a high specific power. Moreover, it is to be noted that the special construction of the machine in accordance with the invention enables a satisfactory specific power to be attained and that active coils which form part of the stator are advantageous with respect to electronic commutation.

The electrical machine in accordance with the invention is very suitable for use as a small motor, for example in electric shavers. Moreover, when constructed as a motor, the electrical machine is suitable for driving, for example, fans and kitchen appliances, while it can also find application in audio and video equipment.

It is to be noted that from European Patent Application 0,230,605 (herewith incorporated by reference) a multi-phase stepping motor is known, which comprises a laminated cylindrical stator body having a plurality of slots situated at a constant pitch, which slots accommodate coils. A thin magnet ring with magnet poles is secured to the stator body, said magnet poles adjoining each other. The known stepping motor further comprises a rotor body having soft-magnetic teeth with tooth surfaces for cooperation with the magnet poles.

Moreover, it is to be noted that U.S. Pat. No. 4,563,602 (herewith incorporated by reference) describes a stepping motor which comprises a cylindrical rotor having teeth which are directed radially outwards and a stator having teeth which are directed radially inwards. The last-mentioned teeth carry permanent magnets in such a way that each of the relevant teeth has a north-pole or a south-pole. Said United States Patent Specification further discloses a linear three-phase synchronous motor having a stator serving as an inductor and having an E-shaped armature. The stator is formed by magnetic and non-magnetic strip-shaped elements which are arranged alternatively side by side and whose longitudinal directions are oriented perpendicularly to the direction of movement of the armature. The armature comprises three limbs which are arranged in line, viewed in the longitudinal direction of said strip-shaped elements, and which each carry a phase winding. At its end which faces the armature each of the limbs further carries a permanent-magnetic strip with a plurality of pole pairs.

A small and powerful electrical machine can be realised by means of an embodiment which is characterized in that the first machine section comprises three groups of four magnets each, each group having two north-pole faces and two south-pole faces, and in that the second machine section comprises eight teeth, each tooth having one tooth surface. For this number of pole faces and tooth surfaces the influence of the stray flux in relation to the number of pole faces is minimal, so that the arithmetical product of the number of flux reversals per revolution of the motor and the maximum flux variation is comparatively large.

In order to link a maximal portion of the flux that can be produced by the magnets into the rotor, an embodiment is characterized in that the centre-to-centre distance between two successive tooth surfaces, measured along an arc of circle near the tooth surfaces, is at least substantially twice as large as the centre-to-centre distance between two adjacent pole faces in each of said groups, measured along the same arc of circle.

An embodiment of the invention will now be described in more detail, by way of example, with reference to the accompanying drawings.

Figure 2:
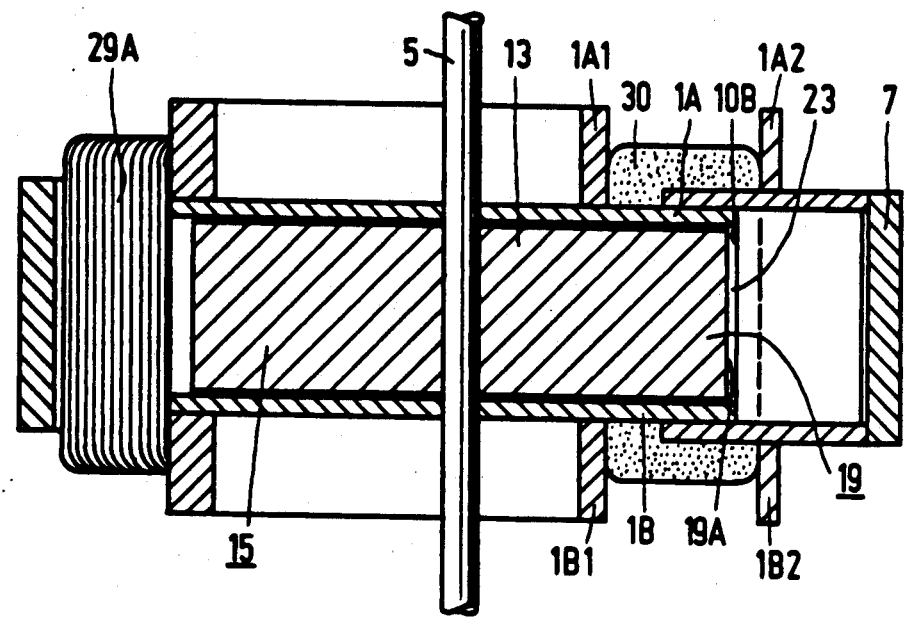

FIG. 1 is an axial view of an embodiment of the electrical machine in accordance with the invention, and FIG. 2 is a sectional view taken on the line 2—2 in FIG. 1.

The electrical machine shown in FIGS. 1 and 2 is an electronically commutated d.c. motor comprising a stator 1 and a rotor 3. The rotor is mounted on a motor shaft 5, which is rotatably supported relative to the stator 1 by suitable bearing means. The stator 1 comprises a circularly cylindrical outer body of a soft-magnetic material, for example soft-iron or a ferroxcube material, and is provided with three groups 9, 10 and 11 of four magnets each on its inner side. The magnets of the groups 9, 10 and 11 are radially magnetised and each comprise a pole face 9A to 9D, 10A to 10D, and 11A to 11D respectively. The said pole faces, which may be curved, preferably circularly cylindrical, or flat, have alternately opposite polarities. In the drawing the polarities are indicated by means of the letters N and S.

The rotor 3 comprises an inner body 13 having eight teeth 15 to 22, which body is made of a plurality of laminations of a soft-magnetic material, such as sheet steel or a ferroxcube material. Said teeth terminate in tooth surfaces 15A to 22A, which are regularly spaced from one another and which cooperate with the pole faces 9A to 9D, 10A to 10D and 11A to 11D via an air gap 23. The tooth surfaces 15A to 22A may be curved or flat in the same way as the pole faces. In the present embodiment the-centre-to centre distance between two successive tooth surfaces, measured along the circumferential circle of the inner body body 13 and indicated by the letters TD in FIG. 1, is twice as large as the centre-to-centre distance, measured along the same circle, between two adjacent pole faces in each of the groups of magnets. The last-mentioned centre-to-centre distance is indicated by the letters PD in FIG. 1. The indications TD and PD may also be read as tooth pitch and pole pitch respectively. The tangential dimension, i.e. the dimension in the circumferential direction of the rotor, of the tooth surfaces 15A to 22A is slightly smaller than or may be equal to the corresponding dimensions of the pole faces 9A to 9D, 10A to 10D and 11A to 11D.

Between the groups 9, 10 and 11 of, magnets coils slots 25, 26 and 27 are formed. Active coils 29, 30 and 31, wound around a plate-shaped first stator section 1A and a plate-shaped second stator section 1B, extend in the coil slots 25, 26 and 27, the coil sides 29A and 31B being disposed in the coil slot 25, the coil sides 29B and 30A being disposed in the coil slot 26, and the coil sides 30B and 31A being disposed in the coil slot 27. Said coil sides, which extend at least substantially parallel to the motor shaft 5, are interconnected in pairs by coil end portions of the active coils. The stator sections 1A and 1B have coil bounding walls 1A1, 1A2 and 1B1, 1B2 respectively, between which the coils 29, 30 and 31 are arranged.

The mechanical power which can be delivered by the d.c. motor shown can be determined by means of the following formula. This formula is:

$$P = 2.C.kc.(cf/ro).\text{eff}.(1-\text{eff}).pp^2.N^2.(A.\phi^2/s).$$

P is said mechanical power delivered by the electric motor. It is often also referred to as electromechanical power, because electric power is converted into mechanical power.

C is a factor having a value smaller than 1. The factor C decreases according as the rotational e.m.f. in the active coils is less constant during the time in which an electric current flows through the active coils and according as the instants at which the active coils are energized and de-energized deviate more from the optimum instants. In this respect it is to be noted that active coils are to be understood to means coils in which a rotational e.m.f. is generated for the conversion of electric power into mechanical power. In the case of a generator the active coils obviously serve to convert mechanical power into electric power.

kc is a commutation factor. The value of kc is 1 if electric currents are passed through the active coils in two directions. If the currents pass through the active coils in only one direction, kc will have the value 0.5.

cf is the copper factor of the active coils.

ro is the resistivity of the copper of the active coils.

eff is the electrical efficiency of the electric motor. This value will generally be approximately 0.8.

N is a reference speed. This is to be understood to mean the speed for which the rotational e.m.f. (E) in the active coils is equal to the voltage (U) of a connected power source.

A is the cross-sectional area occupied by the active coils in a cross-section oriented transversely of the motor axis and intersecting the teeth. How the coils are interconnected is then irrelevant.

$\phi$ is the maximum portion of the magnetic flux produced by the energising elements which can be linked by every active coil. In this respect it is to be noted that this portion in conjunction with the electric currents through the active coils dictates the electromechanical torque and produces the rotational e.m.f. in the active coils. In the present context the term stray flux is to be understood to mean the portion of the flux produced by the energising elements which cannot be linked by the active coils.

pp is the number of complete reversals of the portion of said flux linked by an active coil per revolution of one machine section relative to the other machine section.

s is the average length of the turns of the active coils, briefly referred to as the average turn length.

The electric motor in accordance with the invention shown in FIGS. 1 and 2 is of such a construction that in the situation as illustrated the tooth surfaces 16A, 17A, 21A and 22A are disposed substantially opposite north-poles of the magnets. The tooth surfaces 19A and 20A are disposed substantially opposite south-poles of the magnets. Consequently, flux will pass from the north-pole faces 9A, 9C, 11A and 11C to the south-pole faces 10B and 10D via the inner body 13 and the teeth 19 and 20, the flux being linked by the active coil 30. This causes such magnetic forces to be exerted on the rotor 3 that the rotor is set into rotation. When the rotor has rotated 360/16 degrees in the clockwise direction the tooth surfaces 18A and 19A will be situated opposite south-pole faces of the magnets and an oppositely directed flux will be obtained through the active coil 30. This results in eight complete flux reversals through the coil 30 for every revolution of the rotor. It will be evident that corresponding flux reversals are obtained in the coils 29 and 31. For the sake of completeness it is to be noted that these reversals are phase-shifted through 120 electrical degrees relative to the flux reversals in the coil 30.

Since the coils are situated in the stationary section of the motor the motor is very suitable for electronic commutation. Moreover, as the magnets and the outer body 7 also form part of the stationary motor section the motor can be manufactured simply, the movable motor section of simple construction hardly presenting any balancing problems. As a result of the special construction of the motor in accordance with the invention the electric motor is furthermore capable of delivering a specific output power for a variety of uses.

Although the embodiment shown is favourable from the point of view of the power rating, at least with respect to the number of magnet groups, the number of pole faces and the number of tooth surfaces, it is obvious that other favourable embodiments are possible within the scope of the invention.

I claim:

1. An electrical multi-pole machine of the electromagnetic type, the machine comprising:
    a first machine section which comprises a soft-magnetic first body provided with permanent magnets having pole faces disposed along a first circularly cylindrical surface, said pole faces extending both axially and tangentially,
    a second machine section which is coaxial with the first machine section and which comprises a second body provided with soft-magnetic teeth having regularly spaced tooth surfaces which are disposed along a second circularly cylindrical surface and which cooperate with the pole faces via an air gap, said tooth surfaces also extending both axially and tangentially,
    at least three active coils each having two opposite coil sides, and
    a machine shaft about which said machine sections are rotatable relative to each other, characterized in that
    the soft-magnetic first body is a cylindrical outer body on whose inner side the radially magnetized magnets are arranged,
    the first machine section is constructed as the stator and the second machine section is constructed as the rotor, and the pole faces, viewed in the circumferential direction of said first cylindrical surface, are arranged in groups, at least three groups of magnets being distinguished, the number of groups of magnets being equal to the number of active coils, which groups are separated from one another by coils slots in which the coil sides of the active coils are accommodated, adjacent pole faces along said first circularly cylindrical surface in each of said groups having opposite polarities,
    a tangential dimension of the axially and tangentially extending tooth surfaces is smaller than or equal to a corresponding tangential dimension of the pole faces, and
    two of said coil sides of the active coils are accommodated in each of the coil slots which extend at least substantially parallel to the machine shaft, said coil sides of each individual active coil each being accommodated in one of the coil slots at opposite sides of one of the groups of magnets and being interconnected by coil end portions.

2. An electrical machine as claimed in claim 1, characterized in that the first machine section comprises three groups of four magnets each, each group having two north-pole faces and two south-pole faces, and in that the second machine section comprises eight teeth, each tooth having one tooth surface.

3. An electrical machine as claimed in claim 1, characterized in that the centre-to-centre distance between two successive tooth surfaces, measured along an arc of circle near the tooth surfaces, is at least substantially twice as large as the centre-to-centre distance between two adjacent pole faces in each of said groups, measured along the same arc of circle.

4. An electrical machine as claimed in claim 1, 2 or 3, characterized in that the machine is an electronically commutated d.c. motor.

* * * * *